United States Patent
Patterson et al.

(10) Patent No.: US 12,518,611 B2
(45) Date of Patent: Jan. 6, 2026

(54) WEAR INDICATOR SYSTEM

(71) Applicant: Transportation IP Holdings, LLC, Norwalk, CT (US)

(72) Inventors: Matthew Patterson, Greenville, SC (US); Marharyta Pliazhuk, Arlington, VA (US); David Bailey, Greenville, SC (US)

(73) Assignee: Transportation IP Holdings, LLC, Norwalk, CT (US)

( * ) Notice: Subject to any disclaimer, the term of this patent is extended or adjusted under 35 U.S.C. 154(b) by 646 days.

(21) Appl. No.: 17/961,250

(22) Filed: Oct. 6, 2022

(65) Prior Publication Data

US 2023/0368634 A1 Nov. 16, 2023

Related U.S. Application Data

(60) Provisional application No. 63/342,380, filed on May 16, 2022.

(51) Int. Cl.
| | |
|---|---|
| G08B 21/18 | (2006.01) |
| B60L 5/38 | (2006.01) |
| B66C 15/06 | (2006.01) |
| G08B 7/06 | (2006.01) |
| H02B 1/20 | (2006.01) |

(52) U.S. Cl.
CPC ........... *G08B 21/18* (2013.01); *B60L 5/38* (2013.01); *B66C 15/065* (2013.01); *G08B 7/06* (2013.01); *H02B 1/20* (2013.01)

(58) Field of Classification Search
CPC .. G08B 21/18; G08B 7/06; B60L 5/38; B66C 15/065; H02B 1/20
See application file for complete search history.

(56) References Cited

U.S. PATENT DOCUMENTS

2020/0036258 A1* 1/2020 Endler ................... H02K 5/167
2023/0368634 A1* 11/2023 Patterson ................. B60L 5/38

FOREIGN PATENT DOCUMENTS

| CN | 117073514 A | * | 11/2023 | ............... G01B 7/16 |
| DE | 3907673 A1 | * | 5/1990 | ............. H01R 39/58 |

(Continued)

OTHER PUBLICATIONS

Search Report mailed Sep. 28, 2023 for corresponding European Patent Application No. 23168952.2 (12 pages).

*Primary Examiner* — Jason C Smith
(74) *Attorney, Agent, or Firm* — K&L Gates LLP (57) ABSTRACT

A wear indicator system may include a switch assembly having a housing, a wear indicator circuit, and an actuator assembly. The housing may connect to a collector shoe assembly having a collector shoe that slides in contact along a conductor bar of a conductor bar assembly, for transferring electrical power between the collector shoe and the conductor bar. The wear indicator circuit may include a communication unit and a switch unit. The actuator assembly may be operably coupled to the housing and to the switch unit and may track along the conductor bar assembly when the collector shoe assembly moves and may contact the conductor bar assembly to depress to a position to activate the switch unit responsive to the collector shoe reaching a designated wear level. The communication unit may communicate a signal indicative of the designated wear level responsive to the switch unit being activated.

19 Claims, 9 Drawing Sheets

(56) References Cited

FOREIGN PATENT DOCUMENTS

| DE | 102017115748 B3 | * | 12/2018 | ............. | G01B 5/068 |
| KR | 20140146379 A | * | 12/2014 | ............. | H01R 39/58 |
| KR | 1020140146379 A | | 12/2014 | | |
| WO | WO-2019153922 A1 | * | 8/2019 | ................ | B60L 5/38 |
| WO | WO-2023006323 A1 | * | 2/2023 | ................ | B60L 5/24 |
| WO | WO-2023036443 A1 | * | 3/2023 | ................ | B60L 5/18 |

* cited by examiner

WEAR INDICATOR SYSTEM

CROSS-REFERENCE TO RELATED APPLICATION

This application claims priority to U.S. Provisional Application No. 63/342,380 (filed 16 May 2022), the entire disclosure of which is incorporated herein by reference.

BACKGROUND

Technical Field

Embodiments of the subject matter herein relate to electrical power transfer systems that utilize moving current collectors.

Discussion of Art

Some items of industrial equipment include moving assemblies that run on electrical power supplied from a source offboard the moving assembly. One example is an overhead or gantry crane that moves along a set of tracks, where power must be supplied to the crane to operate a winch motor. Another example is a vehicle that receives electrical power, while moving, from an overhead line or a wayside rail. To transfer power to the moving assembly, the moving assembly includes one or more current collector shoes, typically made of a carbon composite or carbon-metal composite material. The collector shoes slide along respective, stationary conductor bars (i.e., power rails or tracks), which are typically copper or steel and connected to a utility grid or other power source to provide, e.g., electrical ground and one or more positive voltage connections.

Due to friction between the collector shoes and metal conductor bars, the collector shoes wear out over time and must be replaced when they have reached a designated wear state (e.g., a designated remaining thickness of the collector shoe, 10-20% life left, etc., depending on the application and end-user policies). For overhead applications, collector shoes may be mounted high above ground, and thus are difficult to inspect from ground level and can be overlooked by maintenance personnel, or even not included in regular maintenance assessments. Untimely collector shoe replacement may result in insufficient power delivered to the equipment, thereby degrading its performance and resulting in possible safety issues. In addition, if a collector shoe wears down completely, this may result in electrical arcing between the shoe mount and the conductor bar, and damage to the conductor bar.

To avoid untimely collector shoe replacement, past systems have been outfitted with means for remotely monitoring collector shoe wear. Examples include optical sensors (e.g., cameras), and electrical alarm circuits embedded in the shoe body itself that are activated when the collector shoe reaches a designated wear level. However, the former is expensive to implement and difficult to calibrate (in terms of correctly visually assessing the relative wear level of the collector shoe through a camera feed), and the latter require extensive modifications to the collector shoe itself, which increases cost and may affect reliability and performance.

It may be desirable to have a collector shoe wear indicator system that differs from existing systems.

BRIEF DESCRIPTION

In an embodiment, a wear indicator system includes a switch assembly having a housing, a wear indicator circuit, and an actuator assembly. The housing is configured for connection to a collector shoe assembly having a collector shoe that slides in contact along a conductor bar of a conductor bar assembly for a transfer of electrical power between the collector shoe and the conductor bar. The wear indicator circuit is at least partially housed in the housing and includes a communication unit and a switch unit. The actuator assembly is operably coupled to the housing and to the switch unit. The actuator assembly is configured to track along the conductor bar assembly when the collector shoe assembly moves and to contact the conductor bar assembly to depress to a position to activate the switch unit when the collector shoe reaches a designated wear level. The wear indicator circuit is configured for the communication unit to communicate a signal indicative of the designated wear level when the switch unit is activated.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to wear indicator systems, e.g., for alerting maintenance personnel when a collector shoe has reached a designated wear level where the collector shoe may need to be replaced. For example, the collector shoe may wear down over time due to sliding in contact along a conductor bar of a conductor bar assembly, for a transfer of electrical power between the collector shoe and the conductor bar, to power a device attached to the collector shoe (such as a gantry crane or vehicle).

In one embodiment, the wear indicator system includes a switch assembly having a housing, a wear indicator circuit, and an actuator assembly. The housing is configured for connection to a collector shoe assembly having a collector shoe that slides in contact along a conductor bar of a conductor bar assembly for a transfer of electrical power between the collector shoe and the conductor bar. The wear indicator circuit is at least partially housed in the housing and includes a communication unit and a switch unit. The actuator assembly is operably coupled to the housing and to the switch unit. The actuator assembly is configured to track along the conductor bar assembly when the collector shoe assembly moves and to contact the conductor bar assembly to depress to a position to activate the switch unit when the collector shoe reaches a designated wear level. The wear indicator circuit is configured for the communication unit to communicate a signal indicative of the designated wear level when the switch unit is activated.

According to various aspects, the actuator assembly, when it tracks along the conductor bar assembly when the collector shoe assembly moves, may move relative to the conductor bar assembly but not in contact with the conductor bar assembly, or it may move relative to the conductor bar assembly and also in contact with the conductor bar assembly. In embodiments, when the collector shoe is new, the actuator assembly moves with the collector shoe assembly but not in contact with the conductor bar assembly, and when the collector shoe has worn down to a particular level (e.g., the designated wear level, or some intermediate wear level that is less than the designated wear level) the actuator assembly moves with the collector shoe assembly in contact with the conductor bar assembly. (Minimizing or otherwise reducing an amount of time in which the actuator assembly contacts the conductor bar assembly may reduce wear on the actuator assembly and thereby prolong the period before maintenance or replacement of the actuator assembly is required.) In other embodiments, the actuator assembly may always contact the conductor bar assembly, regardless of collector shoe wear level.

According to one aspect, the designated wear level is a selected or determined level or degree of wear of a collector shoe that is indicative of or otherwise relates to a condition of the collector shoe where the collector shoe needs to be replaced, or is within a wear threshold (e.g., one to two weeks of normal use) of needing to be replaced. The level of wear corresponding to when the shoe should be replaced may vary from application to application. Factors include manufacturer specifications, the end use application of where the shoe is used, environmental conditions, local equipment maintenance regulations, designated safety criteria, collector shoe and conductor bar material specifications, and so on. In embodiments, the designated wear level may reflect avoiding the collector shoe completely wearing through, and it may also reflect providing a wear buffer (as mentioned above) such that even after the designated wear level is detected and a signal (e.g., maintenance alert signal) is communicated, the collector shoe will not completely wear through even with additional normal duty-cycle use for a designated time period (e.g., one week). This recognizes that it may not be possible to immediately replace a collector shoe (e.g., due to required continued use of the equipment in question, or due to unavailability of maintenance personnel or equipment), and that maintenance personnel may not be immediately cognizant of the communicated signal.

In embodiments, the communication unit includes a light element (that is, an electronic or electrical device that emits visible light or other light, such as an LED or incandescent light bulb), and the signal is embodied as changes in light emitted by the light element, e.g., from a deactivated state of the light element where no light is emitted to an activated state of the light element where light is emitted, and/or vice versa, including the possibility of repeating patterns of emitted light and lack of emitted light (e.g., a flashing light). Other possibilities include changes in light intensity, changes in emitted light coloration, etc. In other embodiments, the communication unit alternatively or additionally includes a sound element (that is, an electronic or electrical device that emits sound waves, such as a speaker), and the signal is embodied as changes in sound waves emitted by the sound element, e.g., from a deactivated state of the sound element where no sound waves are emitted to an activated state of the sound element where sound waves are emitted, and/or vice versa, including the possibility of sound waves with varying intensity or varying frequency.

In other embodiments, the communication unit includes a wireless communication unit, e.g., having an antenna and a transceiver. Here, the signal may include RF signals or other wireless signals that are configured for receipt by a second communication unit located apart from the wear indicator circuit, e.g., at a different location in a facility than where the wear indicator circuit (and related equipment) is located. The wireless signals include information that is configured for processing by a remote/off-board electronics device (meaning apart from the wear indicator circuit) attached to the second communication unit, for the electronics device to generate a local alert, local alarm, other local notification, or other local control signal relating to the designated wear level of the collector shoe. For example, the remote electronics device may include a computer, a tablet, a cellphone/smartphone, an electronic display, etc. that is configured to convey an alert to maintenance personnel upon receiving the control signal. According on one aspect, the remote electronics device may be configured, responsive to receiving the signal, to automatically: schedule a maintenance operation for maintenance personnel to replace the collector shoe (or multiple collector shoes); order replacement collector shoes (e.g., relative to a known inventory level of replacement collector shoes); track and analyze data of collector shoe usage over time; and/or the like.

Figure 1:
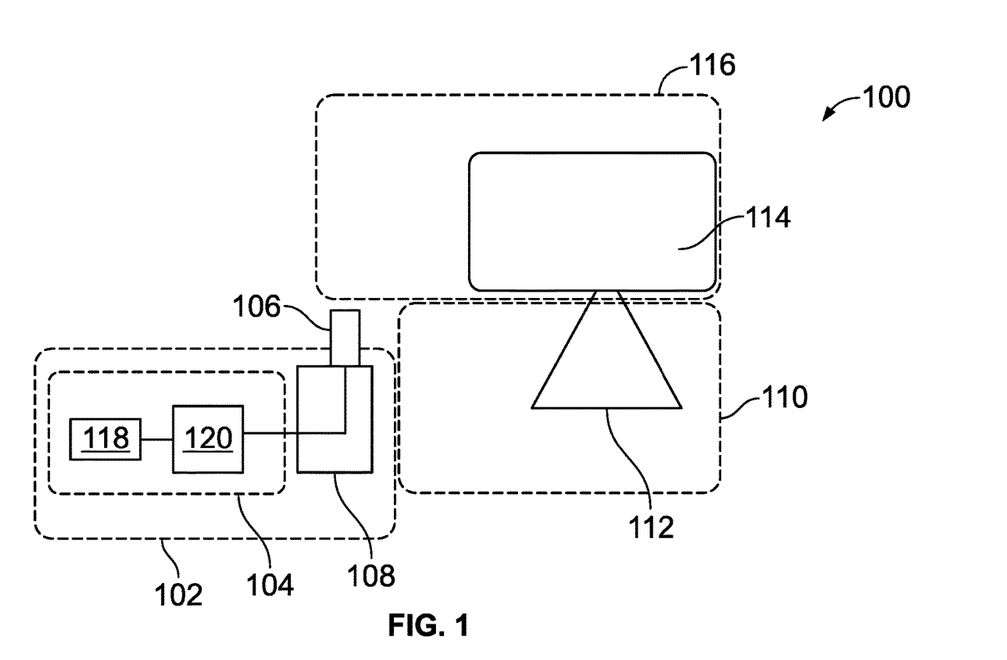
FIG. 1 is a schematic view of a first embodiment of a wear indicator system in a first operational state.
Figure 2:
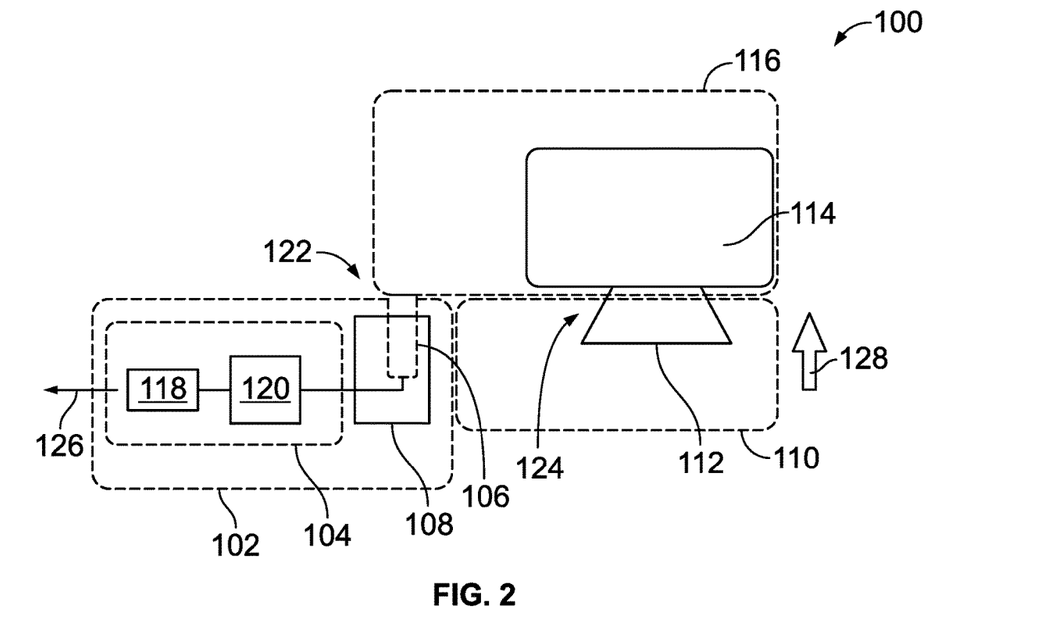
FIG. 2 is a schematic view of the first embodiment of the wear indicator system in a second operational state.

Now with reference to the FIGS. 1 and 2, an embodiment of a wear indicator system 100 includes a switch assembly 102 having a wear indicator circuit 104, an actuator assembly 106, and a housing 108. The housing is configured for connection to a collector shoe assembly 110 having a collector shoe 112 that slides in contact along a conductor bar 114 of a conductor bar assembly 116, for a transfer of electrical power between the collector shoe and the conductor bar. The wear indicator circuit is at least partially housed in the housing and has a communication unit 118 and a switch unit 120. The actuator assembly is operably coupled to the housing and to the switch unit, and is configured, as shown in FIG. 1, to track along the conductor bar assembly when the collector shoe assembly moves, and, as shown in FIG. 2, to contact the conductor bar assembly to depress to a position 122 to activate the switch unit when the collector shoe reaches a designated wear level 124. The wear indicator circuit is configured for the communication unit to communicate a signal 126 (e.g., flashing light, RF signal, or the like) indicative of the designated wear level when the switch unit is activated.

According to an aspect, since the switch assembly 102 is attached to the collector shoe assembly 110, it moves laterally along with the collector shoe assembly as the collector shoe assembly slides along and moves relative to the conductor bar 114. (The collector shoe assembly may move, for example, under operation of one or more electric motors that are configured to drive a movement or positioning mechanism of the equipment, e.g., crane or vehicle, powered by the collector shoe-conductor bar power transfer.) Also, an axial distance between the actuator assembly 106 and the conductor bar assembly 116 is established by the collector shoe 112, such that when the collector shoe is new, as shown in FIG. 1, the actuator assembly is located further away from the actuator assembly (and, in some embodiments, not in contact with the actuator assembly), and as the collector shoe wears down over time due to frictional interaction sliding along the conductor bar, the actuator assembly corresponding moves closer to the conductor bar assembly (see arrow 128 in FIG. 2). At the point when the collector shoe has worn down to the designated wear level, the actuator assembly is positioned to activate the switch unit.

Figure 3:
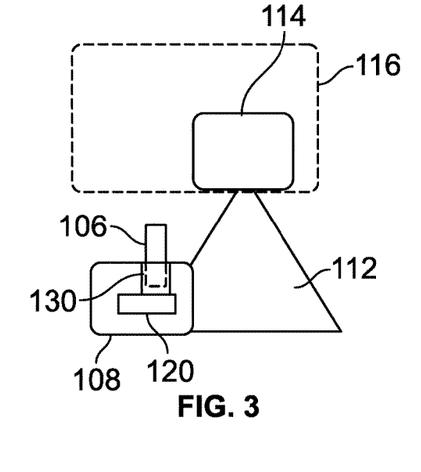
FIGS. 3, 4, and 5 are schematic views of a second embodiment of a wear indicator system in first, second, and third operational states, respectively.
Figure 4:
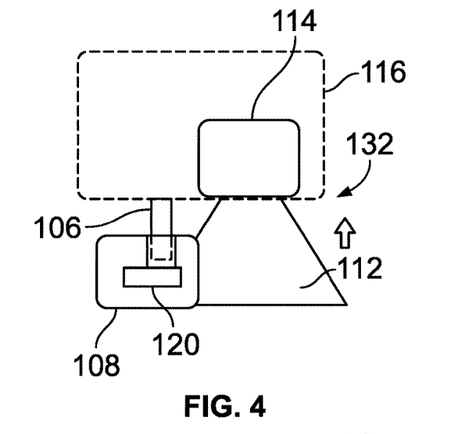
Figure 5:
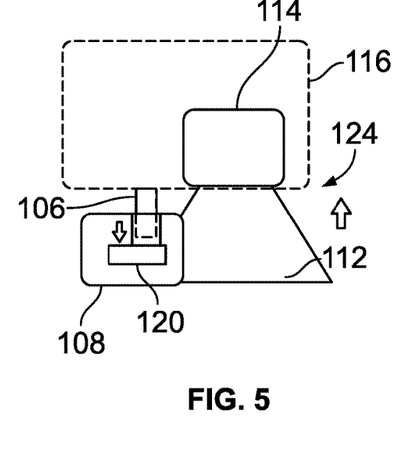

In embodiments, with reference to FIGS. 3, 4, and 5, the actuator assembly 106 may be slidingly received in an aperture 130 in the housing 108. Initially, as shown in FIG. 3, when the collector shoe 112 is new, or has worn down to a level less than a second wear level 132 that is less than the designated wear level 124, the actuator assembly tracks along the conductor bar assembly (along with the collector shoe assembly) but not in contact with the conductor bar assembly. As shown in FIG. 4, the actuator assembly contacts the conductor bar assembly, but does not activate the switch unit, when the collector shoe has worn down to the second wear level. As the collector shoe continues to wear down between the second wear level and the designated wear level, the actuator assembly continues to contact the bar assembly and is also gradually depressed into the housing. As shown in FIG. 5, when the collector shoe reaches the designated wear level, the actuator assembly reaches a position in the housing to actuate the switch unit for powering the communication unit to transmit the signal.

Figure 6:
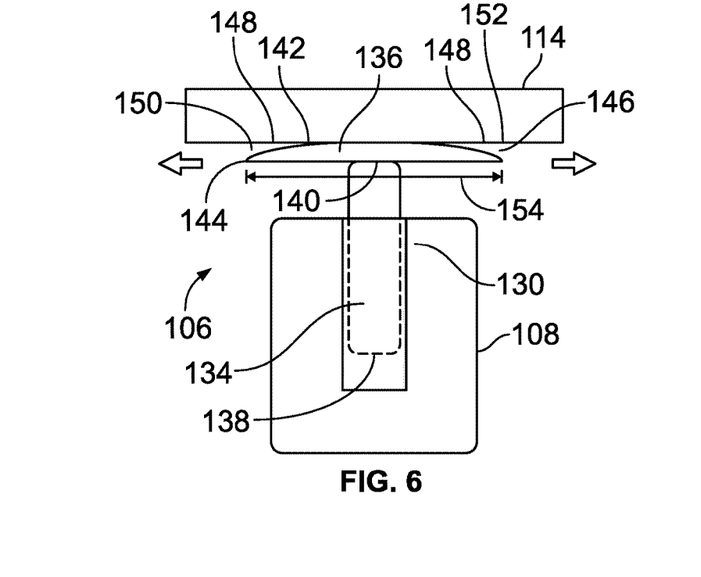
FIG. 6 is a schematic view of an embodiment of an actuator assembly.

In embodiments, with reference to FIG. 6, the actuator assembly 106 may include a plunger arm 134 and an actuator head 136. The plunger arm has a first end 138 disposed in the aperture 130 in the housing 108 and a distal, second end 140. The actuator head is attached to the second end of the plunger arm outside the housing and is configured for contact with the conductor bar assembly. (For example, the actuator head may be positioned and oriented so that when the switch assembly is attached to the conductor bar assembly and the collector shoe has worn down to the designated wear level, the actuator head contacts the conductor bar assembly. Also, the actuator head may have a profile or shape that reduces frictional interaction between the actuator head and conductor bar assembly when the actuator head is in contact with and laterally slides along the conductor bar assembly, relative to actuator heads with other profiles or shapes.) The actuator head includes an elongate body 142 having a first end 144 and a distal, second end 146. The first and second ends 144, 146 define respective sloped end surfaces (e.g., rounded or angled) 148 that are configured to present leading and trailing gaps 150, 152 between the ends of the actuator head and the conductor bar assembly when the actuator head slides in contact along the conductor bar assembly. According to one aspect, the gaps established by the sloped end surfaces may facilitate the actuator assembly transitioning across gaps between adjacent sections of conductor bar (e.g., a facility may have different sections/blocks of conductor bar that are electrically isolated from one another) or transitioning over bumps or other irregularities.

A long axis 154 of the actuator head defines a length of the actuator head. In embodiments, the length of the actuator head is from 10 cm to 20 cm long. According to one aspect, this may allow the actuator head to traverse, or more smoothly or readily traverse, gaps between adjacent sections of conductor bar, relative to an actuator head having a smaller length.

In embodiments, with reference to FIGS. 7, 8, 9, and 10, the actuator assembly 106 may further include a first resilient member 156 (e.g., a compression spring, a rubbery polymer bushing or other polymer bushing, or the like) and a lever arm 158. The lever arm has a first end 160 and a second end 162 and is pivotally attached inside the housing between the first and second ends of the lever arm. The first end 138 of the plunger arm 134 contacts the first end of the lever arm. The first resilient member 156 is disposed between the housing and the first end of the lever arm and biases (pushes) the lever arm and the plunger arm upwards. The switch unit 120 includes a magnet switch 164, a magnet unit 166, and a second resilient member 168 (e.g., a compression spring, a rubbery polymer bushing or other polymer bushing, or the like). The magnet unit is slidably disposed in a slot 170 in the housing, and the second resilient member is disposed in the slot in engagement with the magnet unit. The magnet switch may include a normally-open magnet switch, or it may include a normally-closed magnet switch. If the magnet switch includes a normally-open magnet switch, the second resilient member may be configured to bias the magnet unit towards the magnet switch. If the magnet switch includes a normally-closed magnet switch, the second resilient member may be configured to bias the magnet unit away from the magnet switch.

The second end of the lever arm is configured, in a first operational position when the lever arm is pivoted for the actuator assembly to be positioned fully upwards (see, e.g., FIGS. 7 and 9), to engage the magnet unit and retain it against the second resilient member. The second end of the lever arm is further configured, in a second operational position when the first end of the lever arm is pivoted downwards by the actuator assembly when the collector shoe reaches the designated wear level (see, e.g., FIGS. 8 and 10), to disengage from the magnet unit for the second resilient member to move the magnet unit towards the magnet switch (if the magnet switch is normally open) or to move the magnet unit away from the magnet switch (if the magnet switch is normally closed). A configuration with a normally-open magnet switch is shown in FIGS. 7, 8, 9, and 10.

Figure 7:
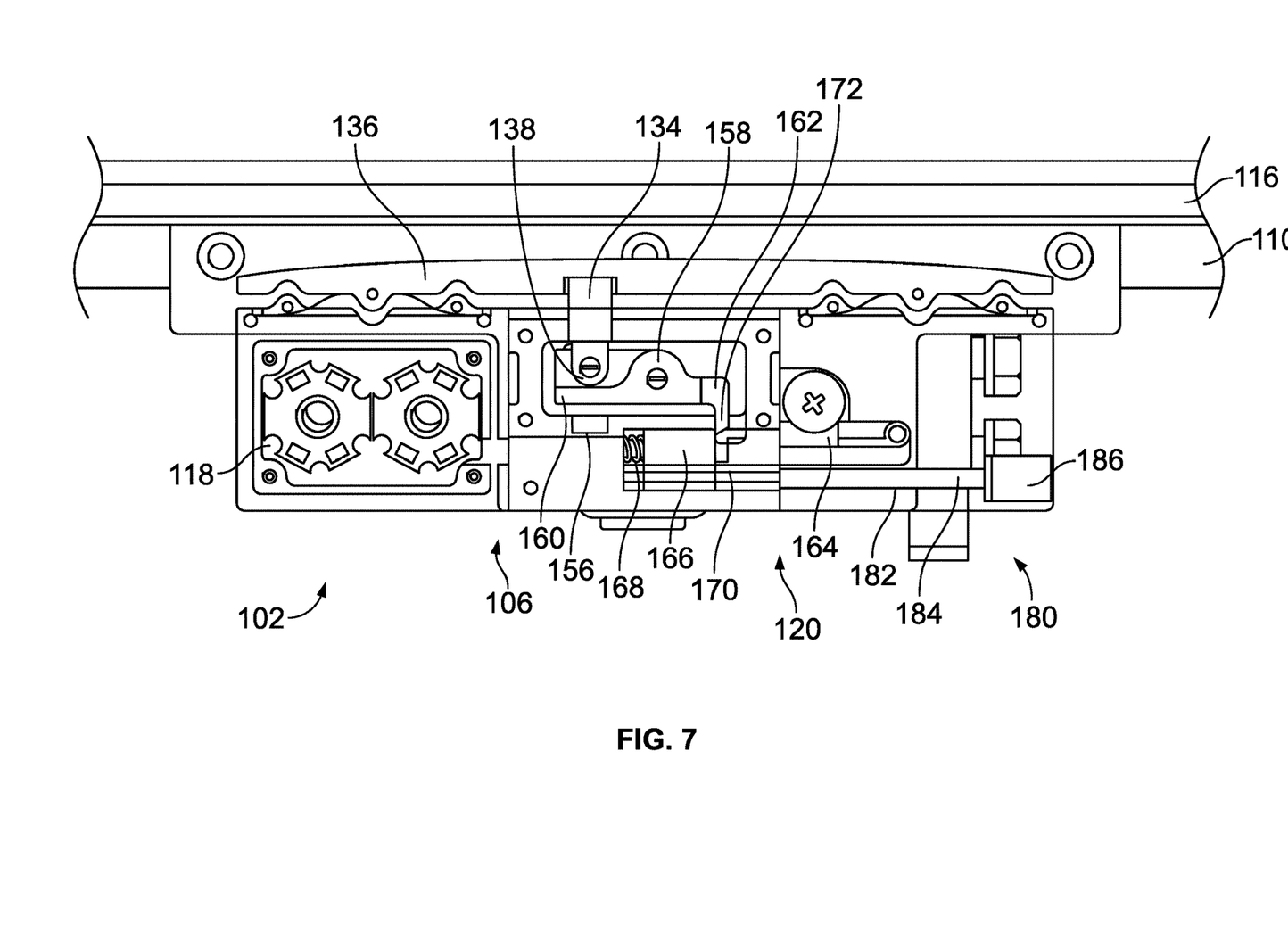
FIGS. 7 and 8 are side elevation views, partially in cut-away to show internal parts, of a third embodiment of a wear indicator system in first and second operational states, respectively.
Figure 8:
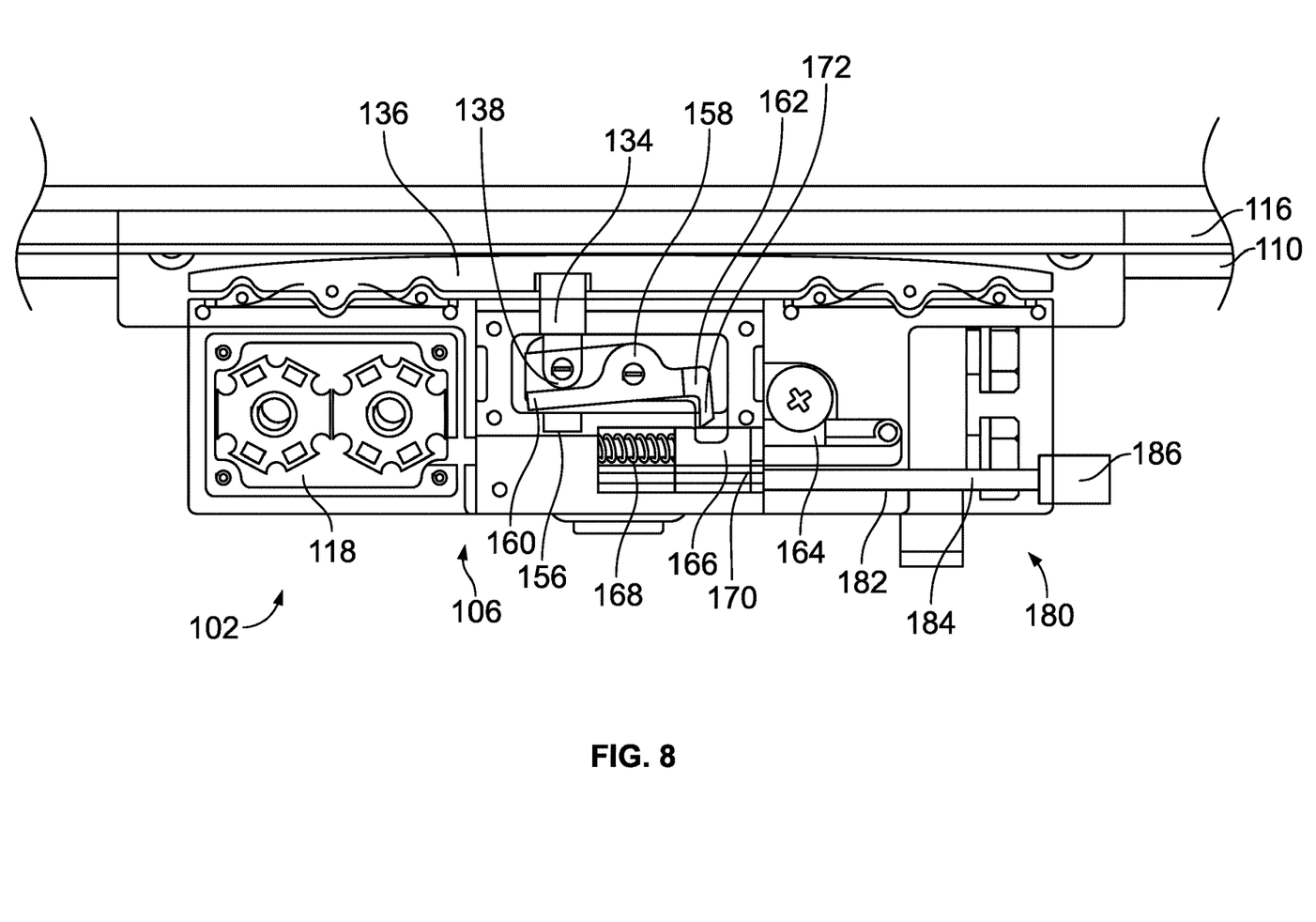
Figure 9:
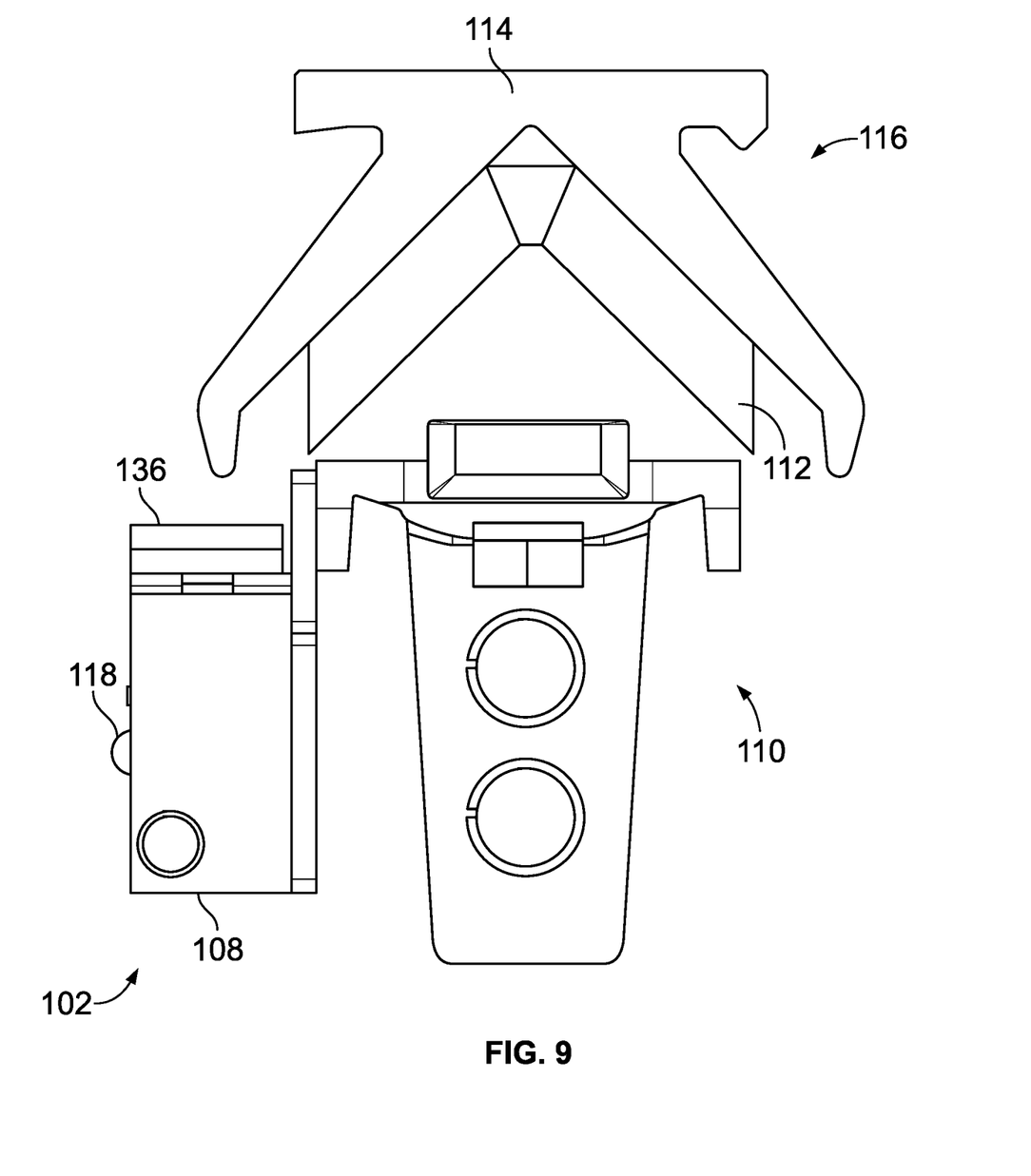
FIGS. 9 and 10 are end views of another embodiment of a wear indicator system in first and second operational states, respectively.
Figure 10:
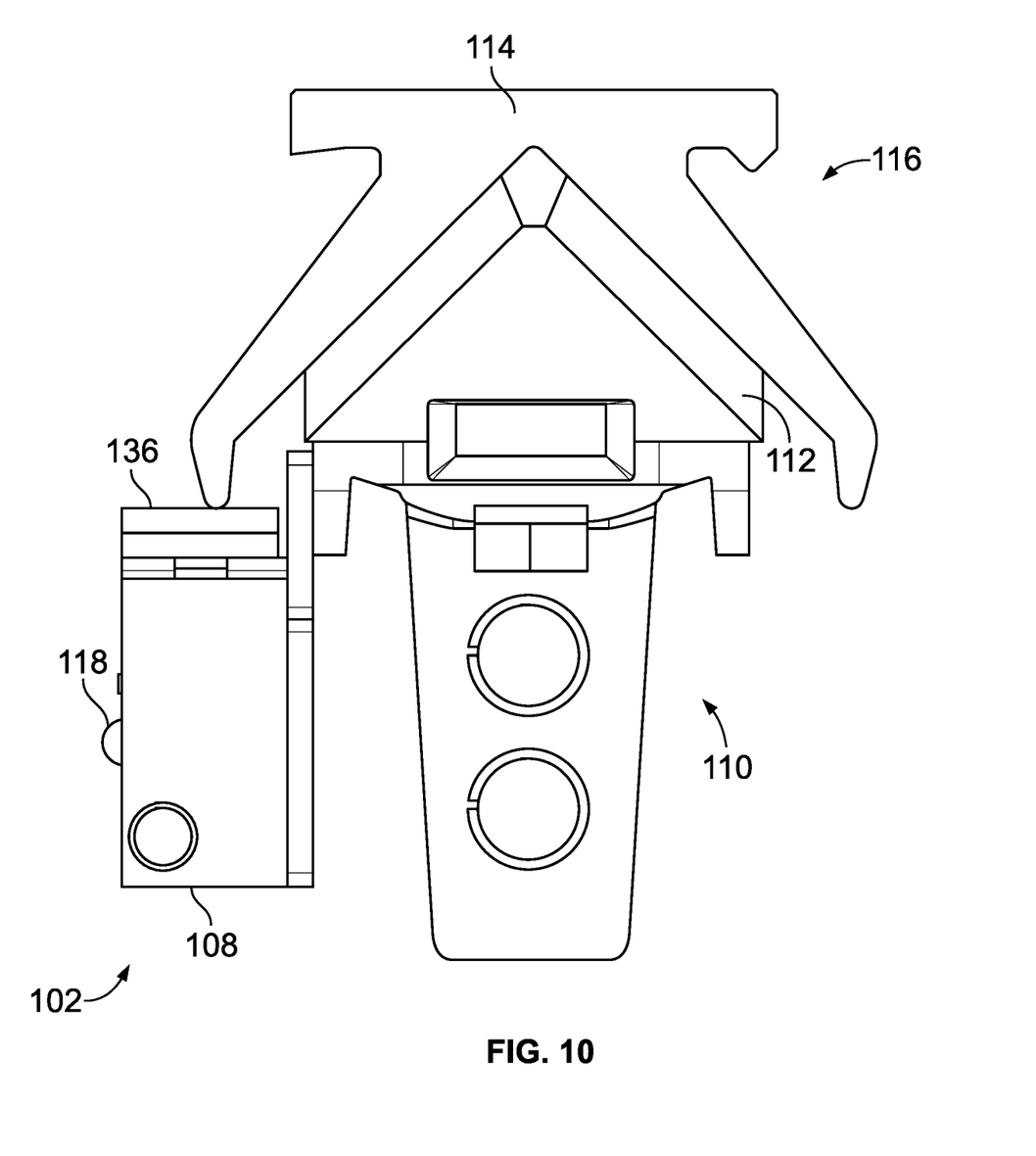
Figure 11:
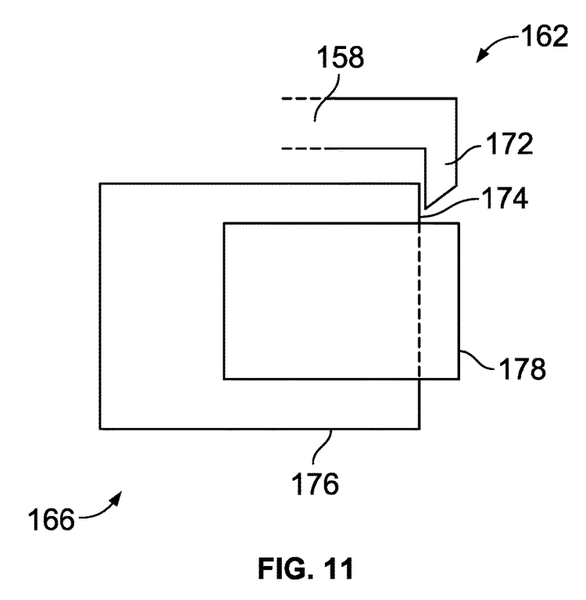
FIG. 11 is a schematic view of an embodiment of a magnet unit in combination with a lever arm.

As shown in FIGS. 7, 8, and 11, in embodiments, the second end 162 of the pivoting lever arm 158 may include a latch 172 (or other retaining member) for engaging the magnet unit and retaining it against the second resilient member when the lever arm is in its first operational position (pivoted for the actuator assembly to be positioned fully upwards). The latch may be a member that extends down from the second end of the lever arm and that is shaped to engage a shoulder 174 or other engagement feature of the magnet unit. ("Engagement feature" means a structure of the magnet unit shaped to engage a latch or other retaining member attached to the second end of the lever arm.) For example, the magnet unit may include a magnet carrier 176 (e.g., a cylindrical member configured to slide in the slot 170) and a magnet 178 disposed in and/or attached to the magnet carrier, with the magnet having a smaller diameter than the magnet carrier and protruding out from an end of the magnet carrier to thereby form the shoulder 174 between the magnet and magnet carrier. Alternatively, the magnet unit may include just the magnet (e.g., with a shoulder formed in the magnet), and/or the engagement feature could include an upper slot or other aperture formed in the magnet unit and configured to receive the end of the latch 172. In other embodiments, the second end of the lever arm could include a pin that is configured to be received in a hole or other aperture formed in the magnet unit (as the engagement feature).

Figure 12:
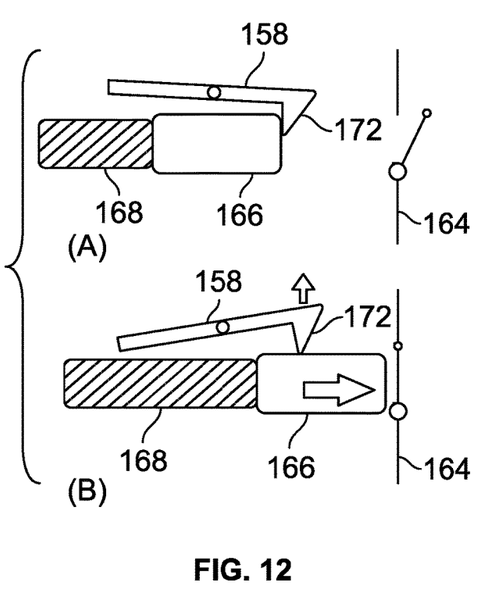
FIG. 12, having parts (A) and (B), is a schematic view of another embodiment of a wear indicator system in first and second operational states, respectively.

Operation of an embodiment of the wear indicator system having a normally-open magnet switch 164 is shown in FIGS. 7, 8, and 12 (showing two operational states A and B). In FIGS. 7 and 12(A), before the collector shoe has worn down to the designated wear level, the first resilient member 156 biases the actuator assembly upwards, maintaining the latch 172 in place against the shoulder 174 of the magnet unit 166. Here, the magnet unit is located far enough away from the magnet switch for the magnet switch to remain open. The magnet unit is thereby held in place against operation of the second resilient member 168, i.e., the second resilient member pushes on the magnet unit but the latch of the lever arm prevents the magnet unit from moving. The magnet switch 164, being normally open, is open. With reference to FIGS. 8 and 12(B), when the collector shoe wears down to the designated wear level, the actuator head 136, in contact with the conductor bar assembly 116, is pushed downwards. This causes the plunger arm 134 to move downwards against the bias of the first resilient member 156. This in turn causes the lever arm to pivot, disengaging the latch 172 from the shoulder 174 of the magnet unit. The magnet unit is thereby free to move in the slot and is pushed towards the magnet switch by the second resilient member 168. The magnet switch is configured to close when the magnet unit is proximate, thereby closing an electrical circuit to activate the communication unit 118.

Figure 13:
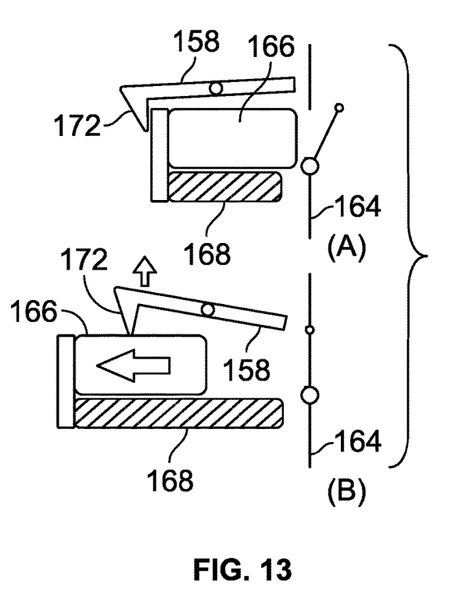
FIG. 13, having parts (A) and (B), is a schematic view of another embodiment of a wear indicator system in first and second operational states, respectively.

Operation of an embodiment of the wear indicator system having a normally-closed magnet switch 164 is shown in FIG. 13 (showing two operational states A and B). In FIG. 13(A), before the collector shoe has worn down to the designated wear level, the first resilient member biases the actuator assembly upwards, maintaining the latch 172 in place against the shoulder 174 of the magnet unit 166. Here, the magnet unit is located close enough to the magnet switch for the magnet switch to remain open. The magnet unit is thereby held in place against operation of the second resilient member 168, i.e., the second resilient member pushes on the magnet unit but the latch of the lever arm prevents the magnet unit from moving. The magnet switch 164, being normally closed, is open. With reference to FIG. 13(B), when the collector shoe wears down to the designated wear level, the actuator head 136, in contact with the conductor bar assembly 116, is pushed downwards. This causes the plunger arm 134 to move downwards against the bias of the first resilient member 156. This in turn causes the lever arm to pivot, disengaging the latch 172 from the shoulder 174 of the magnet unit. The magnet unit is thereby free to move in the slot and is pushed away from the magnet switch by the second resilient member 168. The magnet switch is configured to close when the magnet unit is moved away, thereby closing an electrical circuit to activate the communication unit 118.

In embodiments, the switch assembly may further include a reset member 180 slidably disposed in a reset receptacle 182 in the housing. The reset member is configured, when actuated, to re-engage the second end of the lever arm with the magnet unit. For example, with reference to FIGS. 7 and 8, the reset member may include a reset shaft 184 and a reset actuation knob 186. The shaft is set in the reset receptacle. A first end of the shaft is connected to the magnet unit, and a distal, second end of the shaft is connected to the knob. In a first operational position, as shown in FIG. 7 and when the magnet unit is engaged by the lever arm, the knob is retracted into a recess in the housing. When the lever arm is actuated to release the magnet unit, the reset member moves along with the magnet unit, pushing at least a portion of the knob out of the recess in the housing. This second operational position of the reset member is shown in FIG. 8. To reset the magnet unit, the knob is pushed inwards back into the recess. This causes the reset shaft to push the magnet unit back to its original position, against operation of the second resilient unit. If the actuator assembly is no longer in contact with the collector bar assembly, the lever arm is free to re-engage the magnet unit to retain it in place until the lever arm is once again actuated. Typically, the reset member will be actuated by maintenance personnel after the wear detection system has been activated responsive to the collector shoe reaching the designated wear level, and then being replaced.

Figure 14:
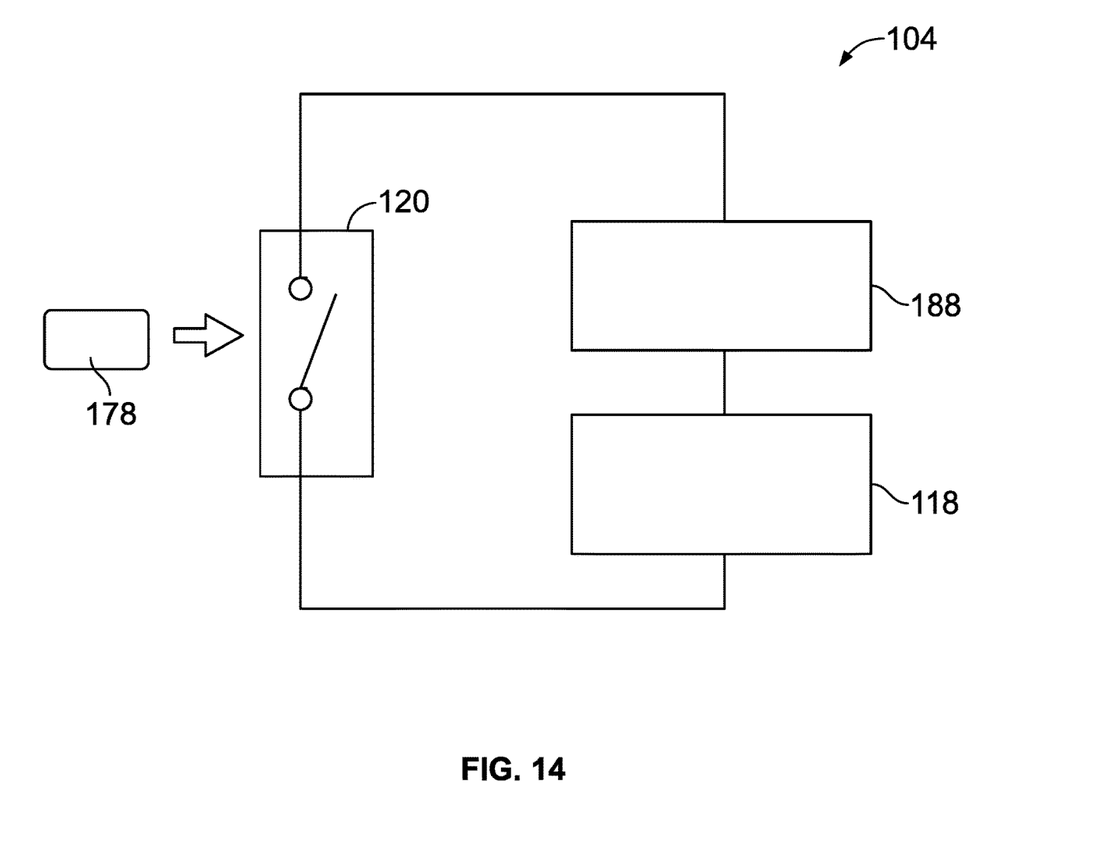
FIG. 14 is a simplified electrical circuit diagram showing an embodiment of a wear indicator circuit.

FIG. 14 shows an exemplary embodiment of the wear indicator circuit 104. The wear indicator circuit may include the switch unit 120, the communication unit 118, and a power source 188, all connected (for example) in electrical series. The power source may include a battery or other energy storage device, or a circuit for transforming power received from the conductor bar (or bars), or a low light/low voltage solar cell, for example. The communication unit, as noted above, may include one or more light elements, in which case the communication unit may also include electrical circuitry for driving the light elements (e.g., flashing, off-to-on, or the like) upon receipt of electrical power from the power source. The circuit is configured so that the switch unit is normally open, but when the collector shoe has worn to the designated wear level, the switch unit closes for closing (e.g., establishing a closed conductive pathway along) the electrical circuit for the power source to electrically power the communication unit.

In embodiments, the communication unit includes a preexisting light element of the industrial equipment or other equipment powered by the collector shoe/conductor bar connection. For example, a light bulb of an overhead crane, where the light bulb is normally on when the crane is operational, but the circuitry of the communication unit is configured to cause the light bulb to start flashing when the switch unit is activated.

Figure 15:
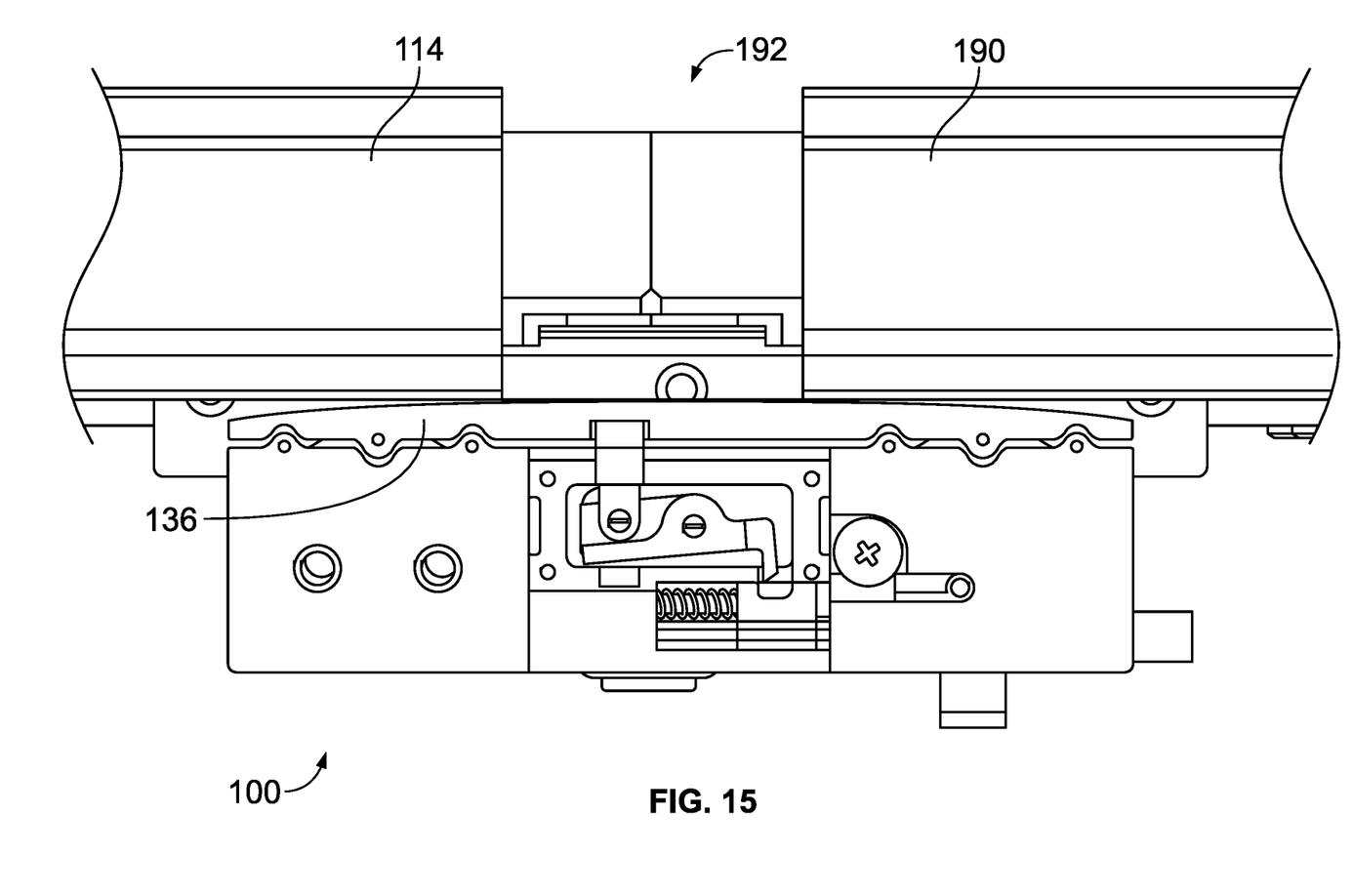
FIG. 15 is a side elevation view, partially in cut-away to show internal parts, of another embodiment of a wear indicator system, showing traversal of a gap in adjacent sections of conductor bar.

FIG. 15 is a side elevation view of an embodiment of the wear indicator system, showing traversal of a gap 192 in adjacent sections 114, 190 of conductor bar. Specifically, a power distribution facility may include one conductor bar 114 that is electrically isolated and/or spaced apart from a second, adjacent conductor bar 190 (with there being the gap 192 between the two). The actuator head 136 may be dimensioned to be long enough to span the gap 192. Additionally, the sloped end surfaces of the actuator head may facilitate traversal across the gap.

In embodiments, a wear indicator system indicates when a power collector shoe has reached its designated wear level and needs to be replaced, giving the operators and maintenance staff advance notice (e.g., up to 7 days). In embodiments, the system is configured to initiate blinking of a high brightness LED when the shoe has reached a specific wear limit.

In embodiments, a mechanical switch is installed to the side of each shoe on the power collection assembly. As the collector wears down (i.e., its height decreases), the mechanical switch slowly lowers vertically. Once the shoe has reached its designated height or wear level, the switch is activated mechanically and connects a battery to an LED activating circuit. This circuit then causes the LED to blink continuously until the shoe is changed or until the battery runs out (a fresh battery should run continuously for 3-7 days). The LED activating circuit can have one of the three possible locations: installed inside the mechanical switch assembly (30-80 ft above ground on the side of the power collection shoe) and include the LED with battery thus the system will have a direct and short switch-circuit-LED wiring; installed inside the crane's side panel box and include the LED with battery (or tap into power available inside the box) and include a direct but long switch-circuit-LED wiring (e.g., long wire between the switch 30-80 ft above ground and the activating circuit); or the activating circuit can be separated between the two locations and work wirelessly. The transmitter part of the circuit along with transmitter battery is installed in the mechanical switch assembly (e.g., 30-80 ft above ground on the side of the power collection shoe) and the receiver end of the circuit is installed inside the crane or other equipment's side panel box or inside a handheld device along with the LED and battery (if it is not possible to use power already available in the box or handheld device).

In embodiments, methods of installation may include changes to a collector shoe mounting bracket, e.g., the addition of the mounting holes for indicator mechanical switch assembly; and/or modifications to the crane or other equipment's side panel box wiring and addition of a running wire along the collector arm.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods.

What is claimed is:

1. A wear indicator system, comprising:
a switch assembly comprising a housing configured for connection to a collector shoe assembly having a collector shoe that slides in contact along a conductor bar of a conductor bar assembly for a transfer of electrical power between the collector shoe and the conductor bar,
the switch assembly including a wear indicator circuit at least partially housed in the housing and having a communication unit and a switch unit, the switch assembly including an actuator assembly operably coupled to the housing and to the switch unit,
the actuator assembly configured to track along the conductor bar assembly while the collector shoe assembly moves and to contact the conductor bar assembly to depress to a position to activate the switch unit responsive to the collector shoe reaching a designated wear level,
the wear indicator circuit is configured for the communication unit to communicate a signal indicative of the designated wear level responsive to activation of the switch unit, and wherein the actuator assembly is configured to:
track along the conductor bar assembly while the collector shoe assembly moves but not contact the conductor bar assembly while a wear level of the collector shoe is less than a second wear level that is less than the designated wear level; and
contact the conductor bar assembly, but not activate the switch unit, while the wear level of the collector shoe is more than the second wear level and less than the designated wear level.

2. The system of claim 1, wherein the communication unit comprises one or more light emitting diodes (LEDs) or other light elements, the communication unit configured for the one or more LEDs or other light elements to be activated responsive to the activation of the switch unit, and the signal comprises transmission of light from the one or more LEDs or other light elements.

3. The system of claim 1, wherein the communication unit comprises an audio device configured to be activated responsive to the activation of the switch unit, and the signal comprises an audio signal generated by the audio device.

4. The system of claim 1, wherein the communication unit comprises a wireless transmitter configured to be activated responsive to the activation of the switch unit, and the signal comprises a radio frequency (RF) signal generated by the wireless transmitter and configured for receipt by an off-board electronic device.

5. The system of claim 1, wherein the actuator assembly comprises a plunger arm and an actuator head, the plunger arm having a first end disposed in an aperture in the housing and a second end, the actuator head attached to the second end of the plunger arm outside the housing and configured for contact with the conductor bar assembly,
the actuator head including an elongate body having a first end and a distal, second end,
the first and second ends of the actuator head body defining respective sloped end surfaces that are configured to present leading and trailing gaps between the actuator head and the conductor bar assembly while the actuator head moves in contact along the conductor bar assembly.

6. The system of claim 5, wherein a length of the actuator head is between ten and twenty centimeters.

7. The system of claim 1, wherein the actuator assembly comprises a plunger arm and an actuator head, the plunger arm having a first end disposed in an aperture in the housing and a second end, the actuator head attached to the second end of the plunger arm outside the housing and configured for contact with the conductor bar assembly,
the actuator assembly further comprising a first resilient member and a lever arm, the lever arm having a first end and a second end and pivotally attached inside the housing between the first and second ends of the lever arm, the first end of the plunger arm contacting the first end of the lever arm, and the first resilient member disposed between the housing and the first end of the lever arm and biasing the lever arm and the plunger arm upwards, the switch unit comprising a magnet switch, a magnet unit, and a second resilient member, the magnet unit slidably disposed in a slot in the housing, and the second resilient member disposed in the slot in engagement with the magnet unit and one of biasing the magnet unit either towards or away from the magnet switch, the second end of the lever arm is configured, in a first operational position while the lever arm is pivoted for the actuator assembly to be positioned fully upwards, to engage the magnet unit and retain the magnet unit against the second resilient member, the second end of the lever arm is further configured, in a second operational position while the first end of the lever arm is pivoted downward by the actuator assembly responsive to the collector shoe reaching the designated wear level, to disengage from the magnet unit for the second resilient member to one of move the magnet unit either towards or away from the magnet switch.

8. The system of claim 7, wherein the magnet unit comprises a magnet carrier and a magnet attached to the magnet carrier, wherein one or more of the magnet carrier, the magnet, or the magnet in conjunction with the magnet carrier define an engagement feature, and the second end of the lever arm defines a latch shoulder that is configured to selectively engage with the engagement feature of the magnet unit.

9. The system of claim 7, wherein the switch assembly further comprises a reset member slidably disposed in a reset receptacle in the housing, the reset member configured to re-engage the second end of the lever arm with the magnet unit responsive to activation of the reset member.

10. The system of claim 7, wherein the switch assembly further comprises a reset member slidably disposed in a reset receptacle in the housing, the reset member having a first end manually accessible outside the housing and a distal, second end within the reset receptacle, the reset member configured, while the second end of the lever arm is in the first operational position and disengaged from the magnet unit, to move the second end of the reset member further into the reset receptacle to push the magnet unit against action of the second resilient member to a position of the magnet unit where the second end of the lever arm engages and retains the magnet unit upon movement of the first end of the reset member towards the housing.

11. The system of claim 7, wherein the magnet switch comprises a normally-open magnet switch, the second resilient member biases the magnet unit towards the magnet switch, and in the second operational position the second end of the lever arm is configured to disengage from the magnet unit for the second resilient member to move the magnet unit towards the magnet switch to close the magnet switch.

12. The system of claim 7, wherein the magnet switch comprises a normally-closed magnet switch, the second resilient member biases the magnet unit away from the magnet switch, and in the second operational position the second end of the lever arm is configured to disengage from the magnet unit for the second resilient member to move the magnet unit away from the magnet switch to close the magnet switch.

13. A wear indicator system comprising:

a switch assembly comprising a housing connected to a collector shoe assembly having a collector shoe that slides in contact along a conductor bar of a conductor bar assembly for a transfer of electrical power between the collector shoe and the conductor bar, the switch assembly including a wear indicator circuit at least partially housed in the housing and having a communication unit and a switch unit, the switch assembly including an actuator assembly operably coupled to the housing and to the switch unit, the actuator assembly configured to track along the conductor bar assembly while the collector shoe assembly moves and to contact the conductor bar assembly to depress to a position to activate the switch unit responsive to the collector shoe reaching a designated wear level, the wear indicator circuit configured for the communication unit to communicate a signal indicative of the designated wear level responsive to the switch unit being activated, and wherein the actuator assembly is configured to:

track along the conductor bar assembly while the collector shoe assembly moves but not contact the conductor bar assembly while a wear level of the collector shoe is less than a second wear level that is less than the designated wear level; and contact the conductor bar assembly, but not activate the switch unit, while the wear level of the collector shoe is more than the second wear level and less than the designated wear level.

14. The system of claim 13, wherein the communication unit comprises one or more light emitting diodes (LEDs) or other light elements, the communication unit configured for the one or more LEDs or other light elements to be activated responsive to the activation of the switch unit, and the signal comprises transmission of light from the one or more LEDs or other light elements.

15. The system of claim 13, wherein the communication unit comprises an audio device configured to be activated responsive to the activation of the switch unit, and the signal comprises an audio signal generated by the audio device.

16. The system of claim 13, wherein the communication unit comprises a wireless transmitter configured to be activated responsive to the activation of the switch unit, and the signal comprises a radio frequency (RF) signal generated by the wireless transmitter and configured for receipt by an off-board electronic device.

17. The system of claim 13, wherein the actuator assembly comprises a plunger arm and an actuator head, the plunger arm having a first end disposed in an aperture in the housing and a second end, the actuator head attached to the second end of the plunger arm outside the housing and configured for contact with the conductor bar assembly, the actuator head including an elongate body having a first end and a distal, second end, the first and second ends of the actuator head body defining respective sloped end surfaces that are configured to present leading and trailing gaps between the actuator head and the conductor bar assembly while the actuator head moves in contact along the conductor bar assembly.

18. A crane system comprising:

a stationary conductor bar assembly having a conductor bar;

a crane unit configured to move relative to the conductor bar assembly and comprising a support frame, a crane motor operably coupled to the support frame, a motor controller configured to electrically power the motor, and a collector shoe assembly having a collector shoe that slides in contact along the conductor bar for a transfer of electrical power between the conductor bar and the collector shoe for the motor controller to power the motor; and a switch assembly comprising a housing, a wear indicator circuit, and an actuator assembly, wherein the housing is connected to the collector shoe assembly, and the wear indicator circuit is at least partially housed in the housing and includes a communication unit and a switch unit, and wherein the actuator assembly is operably coupled to the housing and to the switch unit, the actuator assembly being configured to track along the conductor bar assembly when the collector shoe assembly moves and to contact the conductor bar assembly to depress to a position to activate the switch unit when the collector shoe reaches a designated wear level, and wherein the wear indicator circuit is configured for the communication unit to communicate a signal indicative of the designated wear level when the switch unit is activated, and wherein the actuator assembly is configured to:

track along the conductor bar assembly while the collector shoe assembly moves but not contact the conductor bar assembly while a wear level of the collector shoe is less than a second wear level that is less than the designated wear level; and contact the conductor bar assembly, but not activate the switch unit, while the wear level of the collector shoe is more than the second wear level and less than the designated wear level.

19. A wear indicator system, comprising:

a switch assembly comprising a housing configured for connection to a collector shoe assembly having a collector shoe that slides in contact along a conductor bar of a conductor bar assembly for a transfer of electrical power between the collector shoe and the conductor bar, the switch assembly including a wear indicator circuit at least partially housed in the housing and having a communication unit and a switch unit, the switch assembly including an actuator assembly operably coupled to the housing and to the switch unit, the actuator assembly configured to track along the conductor bar assembly while the collector shoe assembly moves and to contact the conductor bar assembly to depress to a position to activate the switch unit responsive to the collector shoe reaching a designated wear level, the wear indicator circuit is configured for the communication unit to communicate a signal indicative of the designated wear level responsive to activation of the switch unit, and wherein the actuator assembly comprises a plunger arm and an actuator head, the plunger arm having a first end disposed in an aperture in the housing and a second end, the actuator head attached to the second end of the plunger arm outside the housing and configured for contact with the conductor bar assembly, the actuator assembly further comprising a first resilient member and a lever arm, the lever arm having a first end and a second end and pivotally attached inside the housing between the first and second ends of the lever arm, the first end of the plunger arm contacting the first end of the lever arm, and the first resilient member disposed between the housing and the first end of the lever arm and biasing the lever arm and the plunger arm upwards, the switch unit comprising a magnet switch, a magnet unit, and a second resilient member, the magnet unit slidably disposed in a slot in the housing, and the second resilient member disposed in the slot in engagement with the magnet unit and biasing the magnet unit either towards or away from the magnet switch, the second end of the lever arm is configured, in a first operational position while the lever arm is pivoted for the actuator assembly to be positioned fully upwards, to engage the magnet unit and retain the magnet unit against the second resilient member, the second end of the lever arm is further configured, in a second operational position while the first end of the lever arm is pivoted downward by the actuator assembly responsive to the collector shoe reaching the designated wear level, to disengage from the magnet unit for the second resilient member to move the magnet unit ether towards or away from the magnet switch.

\* \* \* \* \*